US009662605B2

(12) United States Patent
Mutha et al.

(10) Patent No.: US 9,662,605 B2
(45) Date of Patent: May 30, 2017

(54) FILTER DETECTION BASED AIR PURIFICATION SYSTEM

(71) Applicant: Narendra Nilkanth Pawar, Pune, Maharashtra (IN)

(72) Inventors: Chirag Satishchandra Mutha, Pune (IN); Bhagyashri Vikas Patil, Deopur (IN)

(73) Assignee: Narendra Nilkanth Pawar, Pune, Maharashtra (IN)

( * ) Notice: Subject to any disclaimer, the term of this patent is extended or adjusted under 35 U.S.C. 154(b) by 0 days.

(21) Appl. No.: 14/785,147

(22) PCT Filed: Apr. 17, 2014

(86) PCT No.: PCT/IN2014/000248
§ 371 (c)(1),
(2) Date: Oct. 16, 2015

(87) PCT Pub. No.: WO2014/178074
PCT Pub. Date: Nov. 6, 2014

(65) Prior Publication Data
US 2016/0067645 A1    Mar. 10, 2016

(30) Foreign Application Priority Data

Apr. 18, 2013  (IN) .......................... 1452/MUM/2013

(51) Int. Cl.
*G08B 21/00*         (2006.01)
*B01D 46/00*         (2006.01)
(Continued)

(52) U.S. Cl.
CPC ........... *B01D 46/0086* (2013.01); *G08B 5/36* (2013.01); *G08B 21/182* (2013.01); *B01D 2273/30* (2013.01)

(58) Field of Classification Search
CPC combination set(s) only.
See application file for complete search history.

(56) References Cited

U.S. PATENT DOCUMENTS 4,040,042 A * 8/1977 Mayer ................. F24C 15/2021
126/299 D
5,871,639 A   2/1999 Hsu
(Continued)

FOREIGN PATENT DOCUMENTS

AU      773871      1/2001
CN      1671196 A   9/2005
(Continued)

OTHER PUBLICATIONS

International Preliminary Report on Patentability; International Application No. PCT/IN2014/000248; International Filing Date: Apr. 17, 2014; Date of Issuance: Oct. 20, 2015; 5 pages.
(Continued)

*Primary Examiner* — Travis Hunnings
(74) *Attorney, Agent, or Firm* — Cantor Colburn LLP (57) ABSTRACT

A filter detection based air purification system for indicating the status of the filters is disclosed that includes a microprocessor configured to determine a status of a composite filter by monitoring a power consumption of the system and thereby comparing the power consumption with predefined values and reference values to revel the performance status of the system. The filter detection based air purification system operates in at least four modes of operation including a self check mode, a second calibration mode, a third normal mode, and a reset mode of operation that are indicated by predefined indicators positioned on a control panel. The indicators indicate to take appropriate actions to improve the system performance related to the conditions of the filters.

15 Claims, 7 Drawing Sheets

(51) Int. Cl.
*G08B 5/36* (2006.01)
*G08B 21/18* (2006.01)

(56) References Cited

U.S. PATENT DOCUMENTS

| | | | |
|---|---|---|---|
| 6,613,236 B1 | 9/2003 | Guess et al. | |
| 7,261,762 B2 * | 8/2007 | Kang | B01D 46/0086 116/DIG. 25 |
| 8,493,221 B2 * | 7/2013 | Cash | B01D 46/0086 236/49.2 |
| 2005/0247194 A1 * | 11/2005 | Kang | B01D 46/0086 95/19 |
| 2006/0070527 A1 * | 4/2006 | Chapman | B01D 46/0086 96/417 |
| 2006/0100796 A1 * | 5/2006 | Fraden | A47L 9/19 702/45 |

FOREIGN PATENT DOCUMENTS

| | | |
|---|---|---|
| CN | 1279119 C | 10/2006 |
| CN | 101713571 B | 7/2013 |
| EP | 2141038 B1 | 11/2010 |

OTHER PUBLICATIONS

International Search Report; International Application No. PCT/IN2014/000248; International Filing Date: Apr. 17, 2014; Date of Mailing: Jan. 21, 2015; 3 pages.

Written Opinion of the International Searching Authority; International Application No. PCT/IN2014/000248; International Filing Date: Apr. 17, 2014; Date of Mailing: Jan. 21, 2015; 4 pages.

* cited by examiner

FILTER DETECTION BASED AIR PURIFICATION SYSTEM

This application is a U.S. national stage of international application number PCT/IN2014/000248 filed Apr. 17, 2014, which claims priority from Indian Application 1452/MUM/2013, filed Apr. 18, 2013, both of which are hereby incorporated by reference in their entirety.

FIELD OF THE INVENTION

The present invention relates to an air purification system that identifies the status of particle removal filter in the system and more particularly to a filter detection based air purification system that detects the useful life and replacement status of a filter installed in the system.

BACKGROUND OF THE INVENTION

Air purification systems are used to purify the polluted air inside the houses, buildings, clean rooms or any such premises. Such systems have series of filters for specific functions or some the systems have composite single filter for simplicity of the user to help to manage the purification system and to replace the filter.

The most commonly used filters are pre-filters or foam filters, particle removal filter and gas adsorption filter. Pre-filters with PP fibre mesh prevent the bigger dirt, dust particles, hairs getting trapped by other non-cleanable filters in the purification system. The PP fibre mesh filter generally is meant to be cleanable and washable.

Particle removal filters are made out of commercial HEPA (High efficiency particulate absorption) or some of them are made out of real HEPA material. Gas adsorption filters are Active carbon filters which are effective against harmful gases like Toluene, Formaldehyde, Benzene etc. Alternatively, there can be a single composite filter in place of separate particle and gas adsorption active carbon filter.

There are prior arts available which alerts the user to change the filter using few concepts. The most popular is based upon the pre-determine threshold volume of air that should pass through the filter. The volume of air that passes through the filter is a function of the RPM of the fan or the blower used in the system and the time for which the system is operating. So the filter life alert is direct function of the time for which the system is operated and the various speed setting, the system is operated.

There is also a prior art which compares the speed of the motor or the fan to the preset speed and then determines if the filter should be replaced or not. Practically all of these prior arts have limitation. The resistance of the filter for the flow of air through it varies from filter to filter. This has direct impact on the motor RPM. It is also a known fact that the motor in-itself has a tolerance of +/−10% on the RPM specification. With above variations of the filter and the motor parameters, the accuracy of the prior art is low. Further the electronics to measure the speed of the motor is also costly.

EP20090164084 to Woo Mu Seon et al. teaches a system and method for changing a filter provided in an air purifier that includes measuring rotational speed of the motor which rotates a fan to direct/inset air into the filter. This measured speed is then compared with an already pre-set value of the rotational speed. Besides, the time for which the motor is running at a particular rotational speed is further measured and compared with the pre-set time for which the motor should run at that speed. Based on these readings and comparisons made with pre-set values therein, the time to change the filter of air purifier can be determined.

US20040840758 to Kang Pengju et al. discloses a method and system for detecting and predicting air filter condition for an air handling system. Accordingly, the technique for detecting and predicting air filter condition of this invention uses a detection statistic to ascertain system resistance. Further, the remaining operable life of the air filter can be predicted therein. The system resistance is determined by using means to determine the approximate expected operation of the air handling system. This approximation is further compared to actual values to obtain a difference. This difference is still further compared with pre-decided threshold values such that if it is more than the threshold, an alarm is sounded, thereby indicating that there is a resistance to air flow. Hence, it can be predicted from this exercise that owing to resistance in air flow, the air filter shall be required to be changed.

There is a need of a filter detection based air purification system that firstly identifies and indicates if a particle removal filter is installed in the air purification system, and secondly if the protective cover on the filters is removed before installing the filter. A filter detection based air purification system is also needed that determines and indicates expiry of a particle removal filters in the system and that the old filter is replaced with a new identical filter.

SUMMARY

A filter detection based air purification system for indicating status of filters in the system including a microprocessor, at least four predefined modes of operation, a control panel including at least three indicators for indicating status of filters based on the power consumption. The microprocessor is advantageously configured to determine status of a pre filter or a composite filter by monitoring power consumption, comparing the power consumption with predefined standard values and reference values. In a preferred embodiment, the composite filter has at least one particle removal filter. The four predefined modes of operation include a first self check mode, a second calibration mode, a third normal mode, and a fourth reset mode of operation. The control panel includes at least three indicators for indicating status of the pre filter or the composite filter based on the power consumption and the mode of operation. The respective indicators are preferaby operable in predefined states of blinking or glowing. A first indicator indicates the operation of the system in the second calibration mode. A second indicator is preferably operable in at least two states such as a first blinking state indicating absence of the composite filter, and a second glowing state indicating that a cover on the composite filter is not removed during an installation. A third indicator is operable in at least two states such as a first blinking state indicating advance warning of end of useful life of the pre-filter or the composite filter, and a second glowing state indicating end of useful life of the composite filter. In the normal mode of operation the current power consumption is preferably within normal operating mode limits as compared to a reference value 'R'. The second calibration mode is in operation when the reference value 'R' is a Null value in the first self check mode. The second calibration mode determines the condition of the composite filter by comparing the current power consumption 'P' with the standard value 'S'. The third indicator is in a first blinking state when the current power consumption 'P' drops by >X % and <X1% of the reference value such that X is a predefined constant. The third indicator is in the second glowing state when the current power consumption P drops by >X1% of the reference value such that X1 is a predefined constant that is greater than X. The motor is halted when the third indicator is in the second glowing state. The fourth reset mode includes activating the second calibration mode while the current power consumption is beyond or not within (+/−Y % of PM1) or (+/−Y % PM2). It is to be noted that PM1 is instantaneous power consumption when the third indicator starts is in blinking state, and PM2 is the instantaneous power consumption when the third indicator is in glowing state. The second indicator is in the first blinking state when current power consumption P is greater than X2% of S such that X2 is a predefined constant and S is a standard value. The second indicator is in the second glowing state when the current power consumption P is less than X3% of the standard value S. It is to be noted that X3 is either equal to or not equal to X2. In the calibration mode the current power consumption is set to reference power R when the current power consumption P is not greater than X2% of S, and current power consumption P is less than X3% of S.

BRIEF DESCRIPTION OF DRAWINGS

The above mentioned and other features, aspects and advantages of the present invention will become better understood with regard to following description, appended claims and accompanying drawings, wherein like reference numerals refer to similar parts throughout the several figures where:

DETAILED DESCRIPTION OF THE DRAWING

While this invention is susceptible of embodiments in many different forms, there is shown in the drawings and will herein be described in detail, a preferred embodiment of the invention with the understanding that the present disclosure is to be considered as an exemplification of the principles of the invention and is not intended to limit the broad aspects of the invention to the particular embodiment illustrated.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate describing the invention.

Figure 1A:
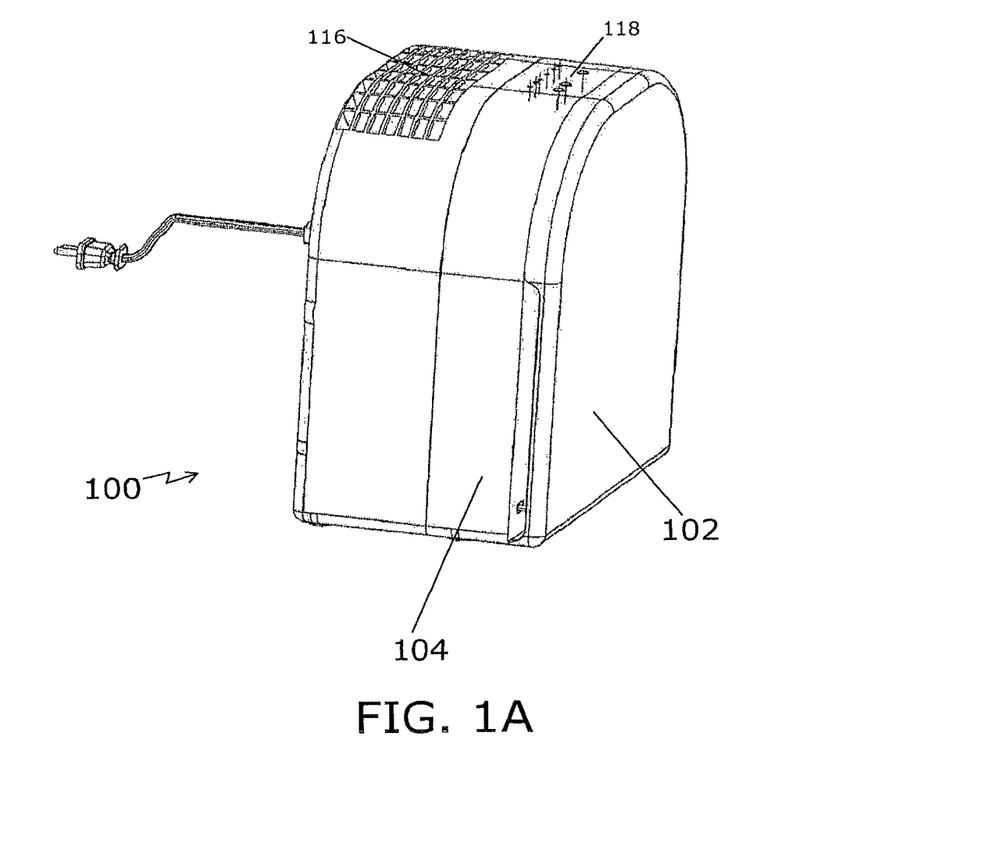
FIG. 1A is a perspective view of a filter detection air purification system in accordance with a preferred embodiment of the present invention.
Figure 1B:
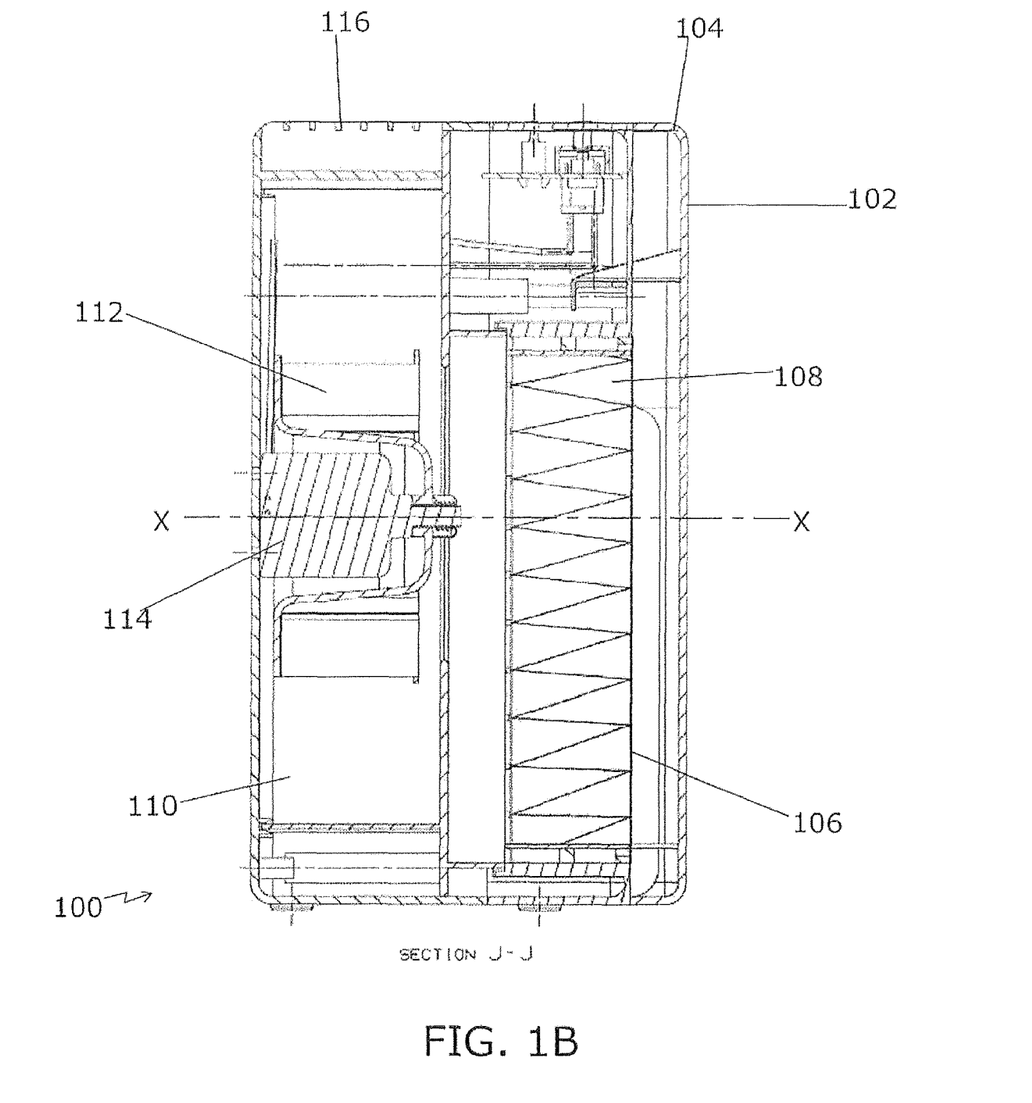
FIG. 1b is a side cross sectional view of a preferred embodiment of the filter detection air purification system of FIG. 1A.
Figure 1C:
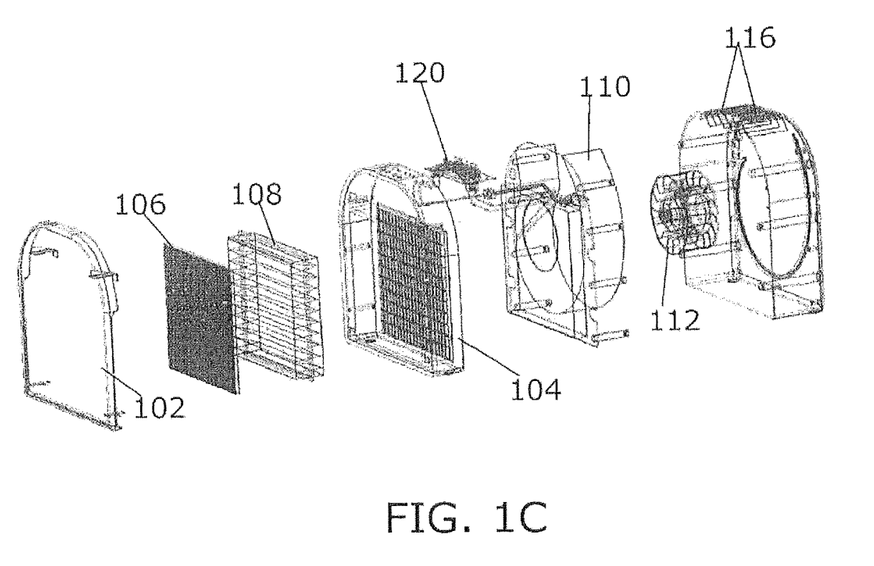
FIG. 1c is an exploded view of the filter detection air purification system of FIG. 1A.

Referring to FIGS. 1A, 1B and 1C, a filter detection based air purification system 100 in accordance with a preferred embodiment of the present invention is described. The filter detection based air purification system 100 includes a front cover 102, a filter housing 104, a pre-filter 106, a composite filter 108, a blower housing 110, a blower 112, a motor 114, air outlet ports 116, control panel 118, and controlling unit 120. The pre filter 106 and composite filter 108 are monitored for their usability in accordance with the present invention. In accordance with the present invention the pre filter 106 is preferably a reusable and/or cleanable filter, whereas the composite filter 108 is preferably one time use filter.

The filter detection based air purification system 100 runs at predefined speeds such that during these predefined speeds the system 100 monitors the power consumption and compares the power consumption relative to a predefined data. The filter detection based air purification system 100 of the present invention is operable in any of the four predefined modes such as a first self check mode, a second calibration mode, a third normal mode and fourth a reset mode of operation.

The first self check mode is executed in accordance with the present invention whenever the system 100 is switched ON. In the self check mode, the system 100 checks if the reference value of power consumption "R" is null or not. If the "R" is null then the second mode which is calibration mode gets in operation else the system 100 runs in the third mode which is normal running mode. The system 100 runs in the third mode most of the times The second calibration mode allows the microcontroller (not shown) to store the power consumption values as a reference values "R" of the system 100 at various speed settings of the system 100, for future references. The third normal mode is executed when the system 100 operates neither in the first self check mode or in the second calibration mode. The system 100 operates in the fourth mode which is reset mode such that the system 100 performs self checks and compares the power consumption of the system 100 with the PM1 and PM2 values of the power consumptions stored in the memory of microcontroller (not shown) to determine further course of actions.

The system 100 advantageously indicates a user by a plurality of indicators about the state of the composite filter 108 in the system and also if the useful life of the composite filters 108 is over. This reduces the air flow. In the present invention, if the flow rate is X then the useful life of the composite filter 108 is said to be over when the flow drops by for example, 50% of X. However, the filter life can be pre-defined to be a different value and the limits of power consumption to determine the end of filter life can be set accordingly.

The system 100 has ability to stop the operation on own to avoid any purification malfunctioning. It is to be noted that the system 100 of the present invention considers a standard value 'S' of power consumption that is power consumption as per the design specifications of the system 100, a reference value 'R' is the power consumed by the system during the calibration mode, and a measured value 'P' which is the current power consumed by the system at any given point of time. It is understood, however, that the reference value 'R' within the acceptable limits of the values as per the known standards in the art.

Figure 2:
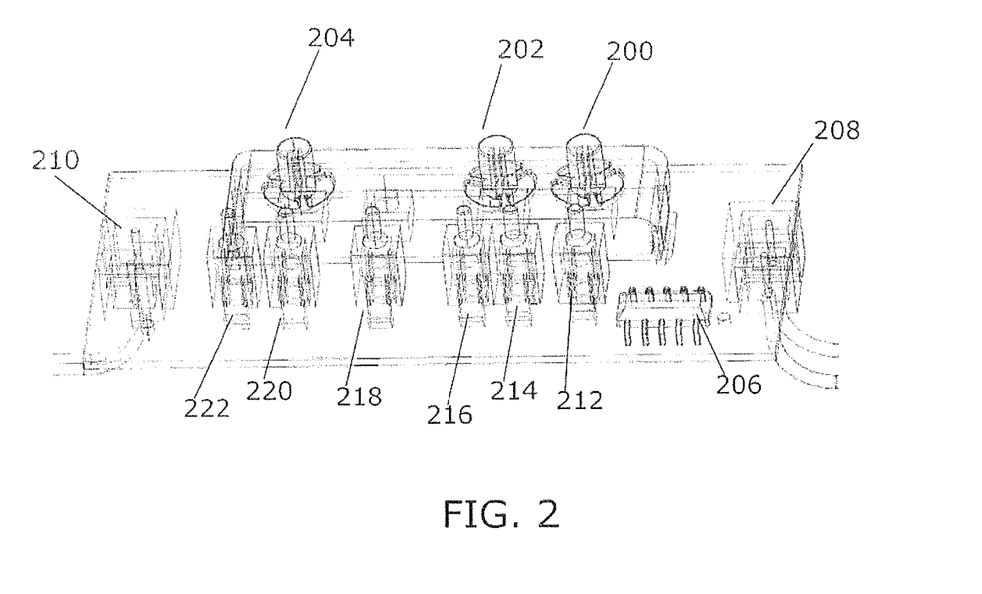
FIG. 2 is a top perspective view of a controlling unit of the filter detection air purification system of FIG. 1A.

Referring to FIG. 2, the controlling unit 120 includes a power on/off switch 200, a speed control switch 202, reset switch 204, a microprocessor 206, input power supply 208, and a plurality of LED indicators. The power ON/OFF switch is to start and stop the system 100. The speed control switch 202 allows the user to switch the system 100 between two predefined speeds, for example, a first low speed and a second high speed. The reset switch 204 is preferably pressed after predefined events, for example, removing the filter cover, replacing the filter with a new filter etc.

The pluralities of LED indicators preferably include a power indicator 212, a low speed indicator 214, and a high speed indicator 216, a first 218, a second 220, and a third indicator 222. In this one preferred embodiment the first indicator 218 is preferably a calibration indicator indicating the operation of the system 100 in the calibration mode, the second indicator 220 is preferably a filter indicator indicating status of the filter 108 in the system 100, and the third indicator 222 is preferably a filter end life indicator for providing an advance warning before the end of useful life, or indicating end of the useful life of the filter 108.

The indicators 212 to 222 are in a blinking state or glowing state as per predefined configuration of the microprocessor 206 of the system 100. For example, a filter indicator 220 blinks and glows to convey predefined message to the users. The system 100 has at least two speed settings such that the motor 114 runs at the two predefined speeds that are achievable by pressing the speed control switch 202. In association with the speed control switch 202, the low speed indicator 214 indicates a first predefined speed and the high indicator 216 indicates the second predefined speed of the motor.

The microprocessor 206 is configured to store the values of the power consumption in accordance with the first self check mode and the second calibration mode that preferably advantageously operate on the basis of firstly reference values of power consumption, and secondly on the power consumption by the system 100 when the useful life of the filter 108 is over. It is to be noted that the power consumption by the system 100 varies depending upon the condition of the composite filter 108. In accordance with the present invention, the reference values are preferably advantageously generated by monitoring the power consumption at the predefined speeds during calibration mode. For example, in case of two predefined speeds, two respective reference values are considered by the system 100.

The microcontroller 206 preferably stores the reference values of power consumption at each speed. The data related to the reference power consumption is generated in the first self calibration mode in accordance with the present invention. During the first normal mode of working, the microprocessor 206 continuously monitors the power consumption of the system 100, and also compares the power consumption for the respective speed with the reference value 'R'.

The first indicator 218 glows when the calibration mode is in operation otherwise the calibration indicator 218 is in 'OFF' state. The second indicator 220 selectively performs the function of indication either by blinking and glowing, for example, when the filter 108 is not installed in the system 100 the second indicator 220 blinks, whereas when the cover on the filter 108 is not removed the second indicator 220 glows.

The third indicator 222 selectively blinks at a predefined frequency or glows to indicate predefined conditions related to the state of the filters 106, 108 in the system 100. The filter end life indicator 222 in the switched off state preferably is an indicator of normal purification functioning of the system 100 from the point of view of the filter life status of filters 106, 108 The third indicator 222 blinks when the pre-filter 106 or the composite filter 108 is approaching end of life, indicating an advance warning before end of useful filter life, for example, during usage when dust particles get trapped in respective filters 106, 108.

Now referring to FIGS. 3A-3D, steps involved in the operational cycle of the filter detection based air purification system 100 are described. In a first step 400, the power supply is switched ON. In a second step 402, a reference value 'R' of the power is checked. It is to be noted that a reference value is the power consumed by the system 100 preferably during the calibration mode and that is preferably within the acceptable limits of the standard values as per the established standards in the art. In the next step 404, if the reference power 'R' is null, then the control shifts to a next step 406 where calibration mode is initiated. However, in the step 404, if the reference power is not null, the control goes to a next step 408.

Figure 3A:
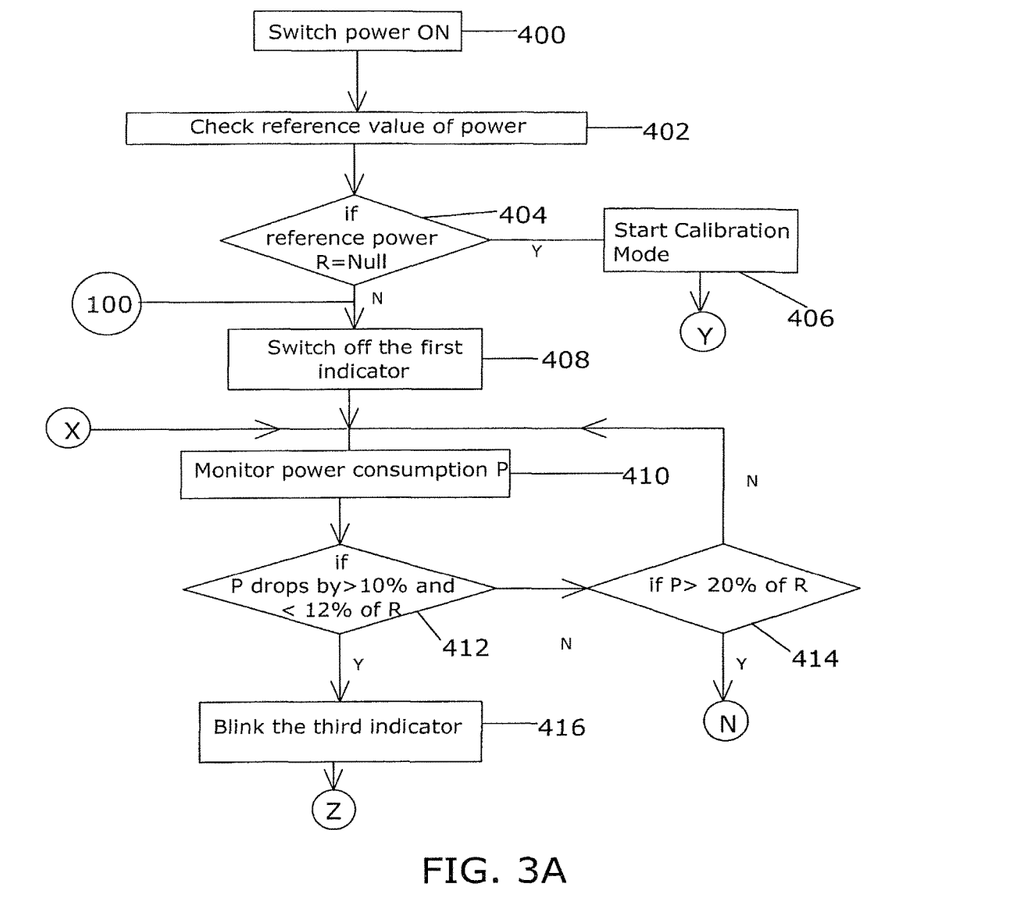
FIGS. 3A-3C show steps in execution of an operational cycle of the filter detection based purification system of FIG.1A.
Figure 3B:
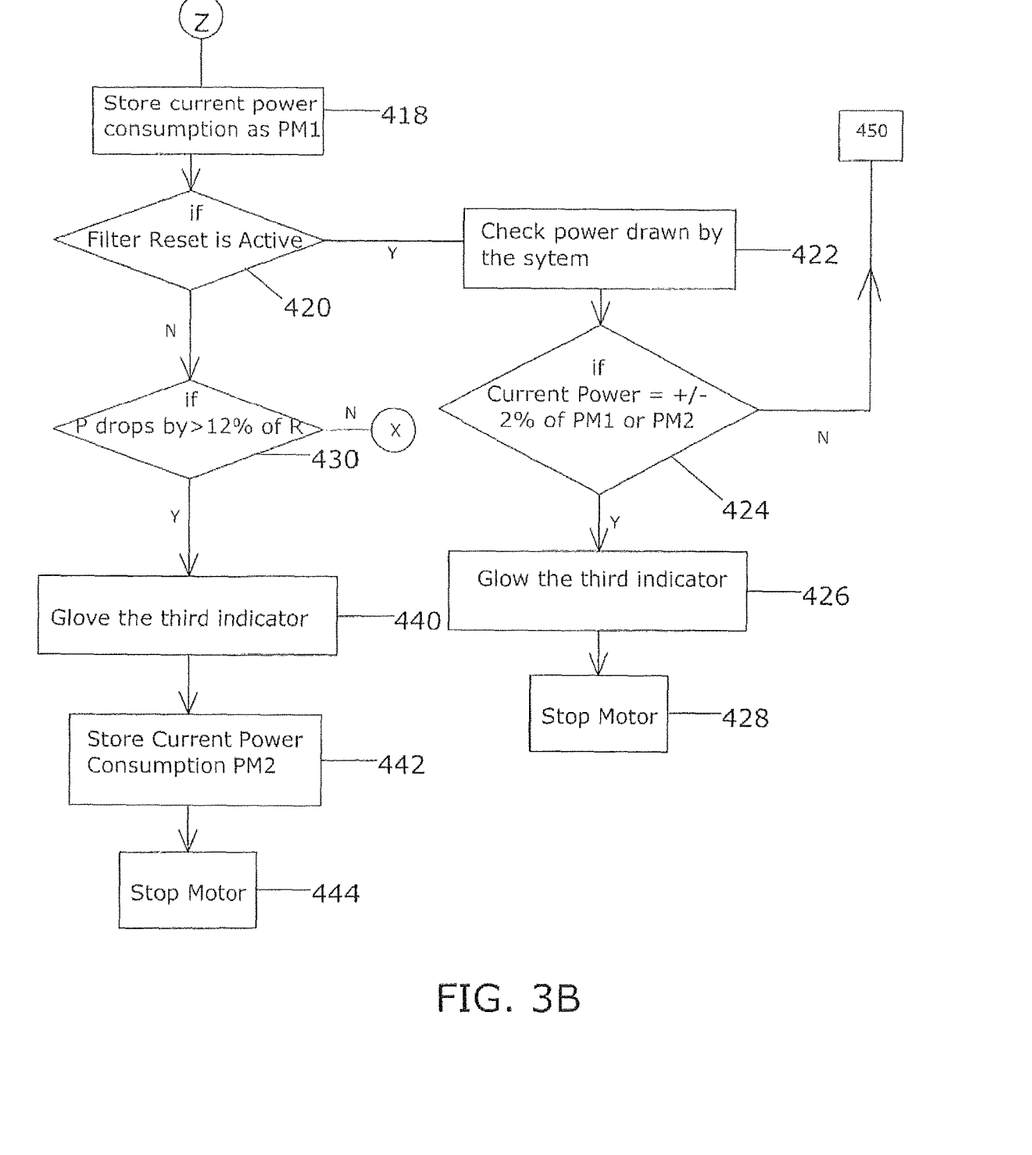
Figure 3C:
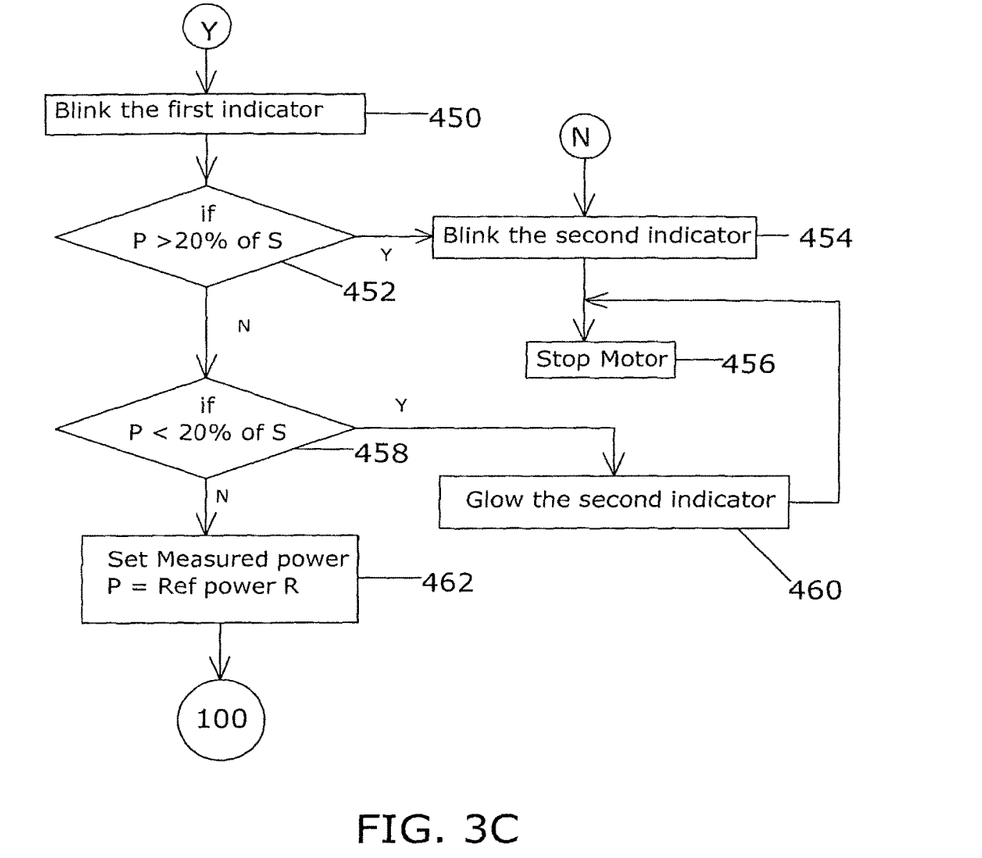

In the step 408, the calibration indicator 218 is switched off indicating that calibration mode is not in operation. In the next step 410, the power consumption is continuously monitored. The operation of the system 100 in the step 410 is the first normal mode of operation of the system in accordance with the present invention. In a next step 412, if (P drops by >10% and <12% of R)=Y then the control goes to a next step 416. In the step 412, if (P drops by >10% and <12%. of R)=N control goes back to the step 414 and then to step 410. In step 414, system checks if the filter 108 is always present during normal working mode.

In the step 416, the third indicator 222 starts blinking. The blinking of third indicator 222 indicates that either pre-filter 106 or the composite filter 108 needs attention, for example, pre-filter 106 needs cleaning. Accordingly, a user can first opt to clean the pre-filter 106. However, even after cleaning the pre-filter 106, in a next operational cycle of the system 100, if the third indicator 222 still continues to blink, then the blinking third indicator 222 indicates end of useful life of the composite filter 108 and it is time to replace the composite filter 108. In a step 418, the current power consumption is stored as PM1. It is to be noted that PM1 values at each speed is stored and that is preferably different at each speed.

In a next step 420, the status of the reset button 204 is checked, and if reset button 204 is active or pressed, then the system 100 operates in the fourth reset mode and control goes to next step 422 in which the power drawn by the system 100 is checked. In a step 424, if the current power is within +/−2% of PM1 or PM2 for the respective speed, then the filter end life indicator 222 starts glowing in a next step 426. The glowing third indicator 222 again indicates that the composite filter 108 should be replaced. The user is supposed to press the reset button 204 only after replacing the composite filter 108. It is to be noted that if the user presses the reset button 204 without replacing the composite filter 108 then the third 222 starts glowing indicating the need of replacement of the composite filter 108. In a step 428, the motor is stopped. In the step 424, if the current power is not within +/−2% PM1 or PM2 at respective speed, then the control goes to the step 450 to the calibration mode.

Now, in the step 420, if filter reset button 204 is not active then control goes to next step 430, in which, if ('P' drops by >12% of 'R') is 'Yes' then control goes to a step 440 in which the third indicator 222 starts glowing indicating that the composite filter 108 needs to be replaced as the composite filter 108 has reached to the end of life. In a step 442, the current power consumption is stored in the memory of microprocessor 206 as PM 2 for all the speed settings, and the motor stops in a next step 444. In step, if ('P' drops by >12% of 'R') is 'No' then control goes to a step 410 to operate the system 100 in accordance with the first normal mode of operation of the present invention.

Now in the step 450, the first indicator 218 starts blinking. In this step, the calibration mode is initiated. The first indicator 218 in blinking condition indicates the user that the second calibration mode is in operation. In a next step 452, if ('P'>20% of 'S') is 'Yes' then the filter indicator 220 starts blinking in a step 454. In a next step 456 the motor is stopped. The blinking condition of second indicator 220 in the step 454 does mean that composite filter 108 needs to be installed.

However, in the step 452, if (P>20% of S) is 'No' then the control shifts to a step 458, in which, if (P<20% of 'S') is 'Yes' then the control goes to a step 460 in which the filter indicator 220 starts glowing, and the control shifts to step 456. It is to be noted that 'S' is the standard value is the design specification of the system 100. The glowing filter indicator 220 is indication that the protective cover on the composite filter 108 is not removed.

In the step 458 in which if (P<20% of S) is "No" then the control goes to a step 462 in which the power 'P' is set as where 'P' is the current power measured in this step, and 'R' is the power consumed by the system 100 during the calibration mode and which is preferably within the acceptable limits of the standard value. After the step 462 the control goes to the step 408. In accordance with the present invention, during the calibration mode, the system 100 runs in all the possible speed settings until the stable readings for power consumption are obtained and recorded in the memory of the microcontroller 206 for each speed settings respectively.

Now referring to FIGS. 1A to 3C, in operation, the front cover 102 is coupled to the filter housing 104 such that the front cover 102 is removable. Front cover 102 is required to be removed during cleaning of the pre-filter 106 or while replacing the composite filter 108 with the new approximately similar to composite filter 108. The front cover 102 advantageously guides incoming air to pre-filter 106. The inlet air then passes through composite filter media 108. Pre-filter 106 and composite filter 108 are housed in filter housing 104. A central axis-X is normal to plane of the blower 112.

The atmospheric air preferably enters through a duct defined by the front cover 102 that is received in the pre-filter 106 and the composite filter media 108 along the axis-X. After passing through the filter media air is sucked in the blower 112 along the axis-X. The air escapes from the blower 112 along a tangential direction relative to the blower 112. Finally, purified air escapes the system through outlet ports 116. It is to be noted that the air enters the system 110 along a central axis-X and the received in the pre-filter 106 and the composite filter 108 escapes through the outlet port 116 along a tangential direction relative to the blower 112.

It is to be noted that the filter based air purification system 100 is preferably provided to a user with the composite filter 108 pre-installed in the system 100 but covered with protective cover. The protective packaging on the composite filter 108 is required to be removed before putting it back into the filter housing 104. The user follows the instruction sequence provided in installation manual along with the system 100. After the system 100 is ready as per the instructions in the user manual, the user connects the mains plug of the supply cord to the supply mains. Before connecting the mains plug to the supply mains, the user ensures that the input supply voltage and frequency mentioned in the user manual of the air purification system 100 matches with that of the supply mains.

Now the user intends to run the system 100 that runs in the first self check mode. Accordingly, during the first time use since the reference power consumption is null, the system 100 runs in the second calibration mode in accordance with the present invention. The second calibration mode is operated that allows the microcontroller 206 to store the power consumption values 'R' of the system 100 at various speed settings of the system 100, for future references. However, during the second calibration mode, the system 100 runs in all the possible speeds until the stable values of the power consumption are obtained and recorded in by the micro controller 206 for each speed settings respectively. In the current embodiment there are two speed settings. During the second calibration mode the second indicator 220 is in blinking condition indicating the operation of the system 100 in the calibration mode. The user initiates the operation of the filter detection based air purification system 100 of the present invention by pressing the ON/OFF switch 200. The power indicator 212 glows as soon as the system 100 is turned on. The system 100 starts working at a default speed that is the first speed. It is understood that the user can change the default to a second speed by pressing the speed control switch 202. The second speed is changeable to the first speed by pressing the same speed switch 202 again. The first speed indicator 214 indicates low speed or the first speed whereas the high speed indicator 216 indicates the second speed or the high speed of the motor 114 of the system 100.

As soon as the system 100 is switched ON, the microprocessor 206 checks for the reference value 'R' of the power stored in the memory of the microprocessor 206. However, it is to be understood that when the system 100 is switched on for a first use, the microprocessor 206 fails to locate the reference value 'R' of the power consumption as the system 100 has not executed the self-calibration mode in which the reference value R is generated.

Now in accordance with the present invention, the filter detection based air purification system 100 of the present invention, in such case initiates the operation in accordance with the self-calibration mode. Accordingly, the first indicator 218 starts blinking while calibration mode is in operation. In calibration mode, the system 100 advantageously runs at both the speed settings until the microprocessor 206 determines the stable power consumption at each of the speed settings. Once the stable readings are determined, the value of power consumption is stored as a reference value in the microprocessor 206. Once the calibration is done, the first indicator 218 is switched off when the operation in the calibration mode is over.

During calibration mode, the microprocessor 206 compares the reference value 'R' with the standard value 'S' stored in the memory of the microprocessor 206. Standard data is the values which are design specifications of the system 100 and is permanently stored in the memory of microprocessor 206. The system 100, in this one preferred embodiment has a design specification of 20 watt and 30 watt power consumption at first and the second speeds respectively with the new stack of filters, however, it is not limited to these specifications and further modifications are possible in accordance with the present invention.

When the reference values R are higher than specified higher limit of the standard value S, which is +15% and +20% for the present embodiment system 100 at first and second speeds respectively, then that is an indication that the composite filter 108 is not installed in the system 100. For such check during the calibration mode the system 100 preferably uses the highest speed setting. Accordingly, the second indicator 220 starts blinking to indicate that the composite filter 108 is not at all installed in the system 100. When composite filter 108 is not installed, then extremely high amount of air flows through the system 100. This causes higher load on the blower 112 and the motor 114 draws more power resulting into overall higher power consumption of the system 100.

When the reference values are lower than the specified limit of the standard value, which is −15% and −20% for the present embodiment system 100 first and second speeds respectively, then that is an indication that the composite filter 108 is installed in the system 100 without removing the packaging material. This check is also preferably done on the highest speed setting.

It is to be noted that when the protective packaging material is not removed from the composite filter 108, then an air flow through the system 100 is not possible. The system 100 keeps on churning the air inside the blower housing. In other words the system 100 runs without any load on the blower 112, and hence extremely low power is drawn by the motor 114 resulting into overall lower power consumption of the system 100. The second indicator 220 starts glowing indicating that the user has installed the composite filter 108 into the system 100 without removing the packaging material.

If the reference values are within the standard values stored 'S' in the memory of the microprocessor 206 of the system 100, then the reference values R are stored in the memory of the microprocessor 206 which completes the calibration process in accordance with the present invention. The second indicator 218 turns off when the calibration is over. Now the filter detection based air purification system 100 starts working in a normal mode of operation which is neither self check mode nor calibration mode. It is to be noted that the reference values are not permanently stored in the microprocessor 206 and that are reset every time the reset button is pressed.

During the third normal mode of operation, the microprocessor 206 continuously compares the power consumption of the system 100 at the background for the respective speed with the reference value 'R'. If the measured value, at any instance is less than the specified limit at the respective speed, for example, in this embodiment (−5% and −10%) of the respective reference value at the two speeds respectively, than the filter end life indicator 222 starts blinking. The microprocessor 206 stores a value of the instantaneous power consumption (PM1) of the system 100 that is advantageously used for a future use for conducting the check to ensure if the composite filter 108 is replaced with the new equivalent composite filter 108 or if the same composite filter 108 is re-installed again.

The blinking of filter end life indicator 222 indicates the advance warning of end of useful life of pre-filter 106 or the composite filter 108. Accordingly, the user may remove the front cover 102 to further remove the pre-filter 106 and then clean the pre filter 106 provided that the pre filter 106 is either blocked or dirty. The front cover 102 is again assembled and the system 100 is switched on. As the system 100 starts working the microprocessor 206 compares the instantaneous power consumption of the system 100 with the reference to PM1 or PM2 value at the respective speed. Now, if the instantaneous power consumption is not within (+/−2%) of the PM1 or PM2 at respective speed, than the system 100 switches to normal mode. The third indicator 222 is switched off indicating that the system 100 is working in the third normal mode of operation. Now it is to be noted that if the system 100 has not indicated any change of the composite filter 108 and hence the user may not press the filter reset button 204.

However, if the power consumption of the system 100, is still not within the (−5% and −10%) of the reference value 'R' at first and second speeds respectively, than the third indicator 222 still continues to blink indicating that the composite filter 108 is required to be replaced with an identical filter. Now, in this case, the user needs to press the filter reset button 204 to activate the fourth reset mode after changing the composite filter 108 with the identical new composite filter 108. The microprocessor 206 then conducts the check if the user has really changed the composite filter 108 with an identical filter 108. Microprocessor 206 checks the current power consumption of the system 100 is within +/2% that of the PM1 or PM2 value at respective speeds stored in the memory of the microprocessor 206 at the time of initiating the blinking signal to the third indicator 222. If the check is positive then the third indicator 222 glows constantly indicating that the composite filter 108 still needs to be replaced with a new approximately identical composite filter 108. The motor 114 is stopped by the microprocessor 206 and the system 100 stops working until the new composite filter 108 is installed in the system 100.

If the user continues to use the system 100 after the third indicator 222 continues to blink, then the resistance for the air flow through the composite filter 108 further increases causing further drop in the load of the blower 112 and drop in power consumption of the motor 114 of the system 100. When the power consumption drops further below 6% and 12% of reference value at first and second speeds respectively, then the third indicator 222 starts glowing constantly. The motor 114 is stopped by the microprocessor 206. The user has to replace the composite filter 108 with the equivalent new composite filter 108.

After changing the filter 108, the user has to press the reset button 204 to activate the fourth reset mode. The microprocessor 206 ensures the replacement of the filter 108 by comparing the revised power consumption of the system 100 with that of the earlier stored value PM2 at respective speeds in the microprocessor 206 at the time of initiating the signal to stop the motor 114. If the revised value is within +/−2% to that of the previously stored value PM2 at respective speeds in the memory of microprocessor 206 at the respective speed at the moment when the second indicator 220 started glowing then the filter indicator continues to glow and motor 114 is stopped by the microprocessor 206 indicating replacement of the composite filter 108. In practice, it may happen if the user has not installed a new composite filter 108 but tried to re-use the earlier composite filter 108.

If the check is negative it means the user has changed the composite filter 108 with the new compatible composite filter 108. The system 100 then executes the self-checking mode which is the self-calibration mode with the new compatible composite filter 108 in the system 100. During calibration mode, the system 100 once again checks if the composite filter 108 is installed or not and if the protective packaging is removed from the composite filter 108 before installing it into the system 100.

The new value of power consumption is then stored as a new reference value erasing/replacing the earlier reference value stored in the memory of microprocessor 206. If the power consumption variation at the lower speeds is too small to detect the status of the life time of the filter then alternatively, the variations of the power consumption at the highest speed setting can be used. In this case every time when the system 100 is switched on, it will perform the filter status check by running the system at highest speed setting before moving to normal working. However the frequency of such check can be changed to every alternate on/off cycle etc.

Obviously many modifications and variations of the present invention are possible in the light of the above teachings. Although a preferred embodiment of the present invention has been illustrated and described, other changes will occur to those skilled in the art. It is therefore intended that the scope of the present invention is to be limited only by the scope of the appended claims.

The invention claimed is:

1. A filter detection based air purification system for indicating status of filters comprising:
   a microprocessor configured to determine status of a pre filter and a composite filter by monitoring power consumption, comparing the power consumption with predefined standard values and reference values;
   at least four modes of operation including a first self check mode, a second calibration mode, a third normal mode, and a fourth reset mode of operation; and
   a control panel including at least three indicators for indicating status of the pre filter or the composite filter based on the power consumption and the mode of operation, the respective indicators being operable in a predefined blinking state or a glowing state.

2. A filter detection based air purification system of claim 1, comprising a first indicator indicating the operation in the second calibration mode.

3. A filter detection based air purification system of claim 1, comprising a second indicator being operable in at least two states, a first blinking state indicating absence of the composite filter, and a second glowing state indicating that a cover on the composite filter is not removed during an installation.

4. A filter detection based air purification system of claim 1, wherein a third indicator is operable in at least two states, a first blinking state indicating advance warning of end of useful life of the pre-filter or the composite filter, and a second glowing state indicating end of useful life of the composite filter.

5. A filter detection based air purification system of claim 1, wherein the normal mode of operation includes a current power consumption being within normal operating mode limits as compared to the power consumed by the system during calibration mode.

6. A filter detection based air purification system of claim 1, wherein the second calibration mode is in operation when the power consumed by the system during calibration mode is a Null value in the first self check mode.

7. A filter detection based air purification system of claim 1, wherein the second calibration mode determines the condition of the composite filter by comparing the current power consumption at a given point in time with the power consumption according to the specifications of the system.

8. A filter detection based air purification system of claim 7, wherein the second indicator is in the first blinking state when current power consumption at a given point in time is greater than X2% of power consumption according to the specifications of the system such that X2 is a predefined constant and power consumption according to the specifications of the system is a standard value.

9. A filter detection based air purification system of claim 8, wherein the second indicator is in the second glowing state when the current power consumption at a given point in time is less than X3% of the power consumption according to the specifications of the system.

10. A filter detection based air purification system of claim 9, wherein the current power consumption is set to power consumed by the system during calibration mode when the current power consumption at a given point in time is not greater than X2% of power consumption according to the specifications of the system, and current power consumption at a given point in time is less than X3% of power consumption according to the specifications of the system.

11. A filter detection based air purification system of claim 1, wherein the third indicator is in a first blinking state when the current power consumption at a given point in time drops by >X % and <X1% of the power consumed by the system during calibration mode such that X is a predefined constant.

12. A filter detection based air purification system of claim 11, wherein the third indicator is in the second glowing state when the current power consumption at a given point in time drops by >X1% of the power consumed by the system during calibration mode such that X1 is a predefined constant that is greater than X.

13. A filter detection based air purification system of claim 12, wherein the motor is halted when the third indicator is in the second glowing state.

14. A filter detection based air purification system of claim 13, wherein the fourth reset mode includes activating the second calibration mode while the current power consumption is beyond or not within (+/−Y % of PM1) or (+/−Y % PM2) wherein PM1 is instantaneous power consumption when the third indicator starts blinking, and PM2 is the instantaneous power consumption when the third indicator starts glowing.

15. A filter detection based air purification system of claim 1, wherein the composite filter including at least one particle removal filter.

* * * * *